US012783238B2

(12) United States Patent
Haehnle et al.

(10) Patent No.: US 12,783,238 B2
(45) Date of Patent: Nov. 3, 2026

(54) VECTOR MEMORY LOADS RETURN TO CACHE

(71) Applicant: Advanced Micro Devices, Inc., Santa Clara, CA (US)

(72) Inventors: Nicolai Haehnle, Polling (DE); Mark M. Leather, Los Gatos, CA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 368 days.

(21) Appl. No.: 18/540,726

(22) Filed: Dec. 14, 2023

(65) Prior Publication Data

US 2025/0199811 A1 Jun. 19, 2025

(51) Int. Cl.
*G06F 9/30* (2018.01)

(52) U.S. Cl.
CPC ........ *G06F 9/3012* (2013.01); *G06F 9/30036* (2013.01)

(58) Field of Classification Search
CPC ........................... G06F 9/3012; G06F 9/30036
See application file for complete search history.

(56) References Cited

U.S. PATENT DOCUMENTS 11,537,397 B2 12/2022 Khorasani et al.
11,579,922 B2 2/2023 Beckmann et al.
12,306,777 B1 * 5/2025 Koh ........................ G06N 3/091
2007/0229521 A1 * 10/2007 Li ............................. G06T 1/60 345/543
2022/0114016 A1 * 4/2022 Goudie ................. G06F 9/4881
2023/0133088 A1 * 5/2023 Fok ........................ G06N 3/045 706/33
2023/0350786 A1 * 11/2023 Rusakovich ........ G06F 11/0778

* cited by examiner

*Primary Examiner* — Zachary K Huson
(74) *Attorney, Agent, or Firm* — Kowert, Hood, Munyon, Rankin & Goetzel, P.C.; Rory D. Rankin

(57) ABSTRACT

An apparatus and method for efficiently processing vector memory accesses on an integrated circuit. In various implementations, a computing system includes a parallel data processing circuit with multiple, replicated compute circuits. Each compute circuit includes a cache that stores temporary data. A control circuit that identifies an instruction of the in-fight wavefronts as a long-latency vector memory access instruction with an indication specifying that a destination targets data storage in the cache, rather than a vector register file. The control circuit assigns a cache line for the vector memory access instruction while foregoing vector register assignment. The control circuit sends a data retrieval request to one or more higher levels of a cache memory subsystem. When the requested data has arrived, the control circuit stores the requested data in the assigned cache line and sends a notification to the corresponding SIMD circuit.

33 Claims, 6 Drawing Sheets

VECTOR MEMORY LOADS RETURN TO CACHE

BACKGROUND

Description of the Relevant Art

Highly parallel data applications are used in a variety of fields such as science, entertainment, finance, medical, engineering, social media, and so on. Machine learning data models, shader programs, and similar highly parallel data applications process large amounts of data by performing complex calculations at substantially high speeds. With an increased number of processing circuits in computing systems, the latency to deliver data to the processing circuits becomes emphasized. The performance, such as throughput, of the processing circuits depends on quick access to stored data. To support high-performance, the memory hierarchy includes storage elements with implementations that transition from relatively fast, volatile memory, such as registers on a processor die to caches either located on the processor die or connected to the processor die, and to off-chip storage with longer access times.

The benefit of the memory hierarchy reduces when the relatively fast, volatile memory is idle for a significant amount of time. One example is when a relatively high number of vector registers of a vector general-purpose register file are used as destination registers of long-latency vector memory instructions. These vector registers are idle from the point in time of instruction issue of the vector memory instruction until the point in time of targeted data is returned. This latency can stretch to several hundred clock cycles. These vector registers remain idle during this latency. These idle vector registers cannot be actively used by other instructions, and these idle vector registers do not store useful data.

In view of the above, efficient methods and mechanisms for efficiently processing vector memory accesses on an integrated circuit are desired.

Figure 1:
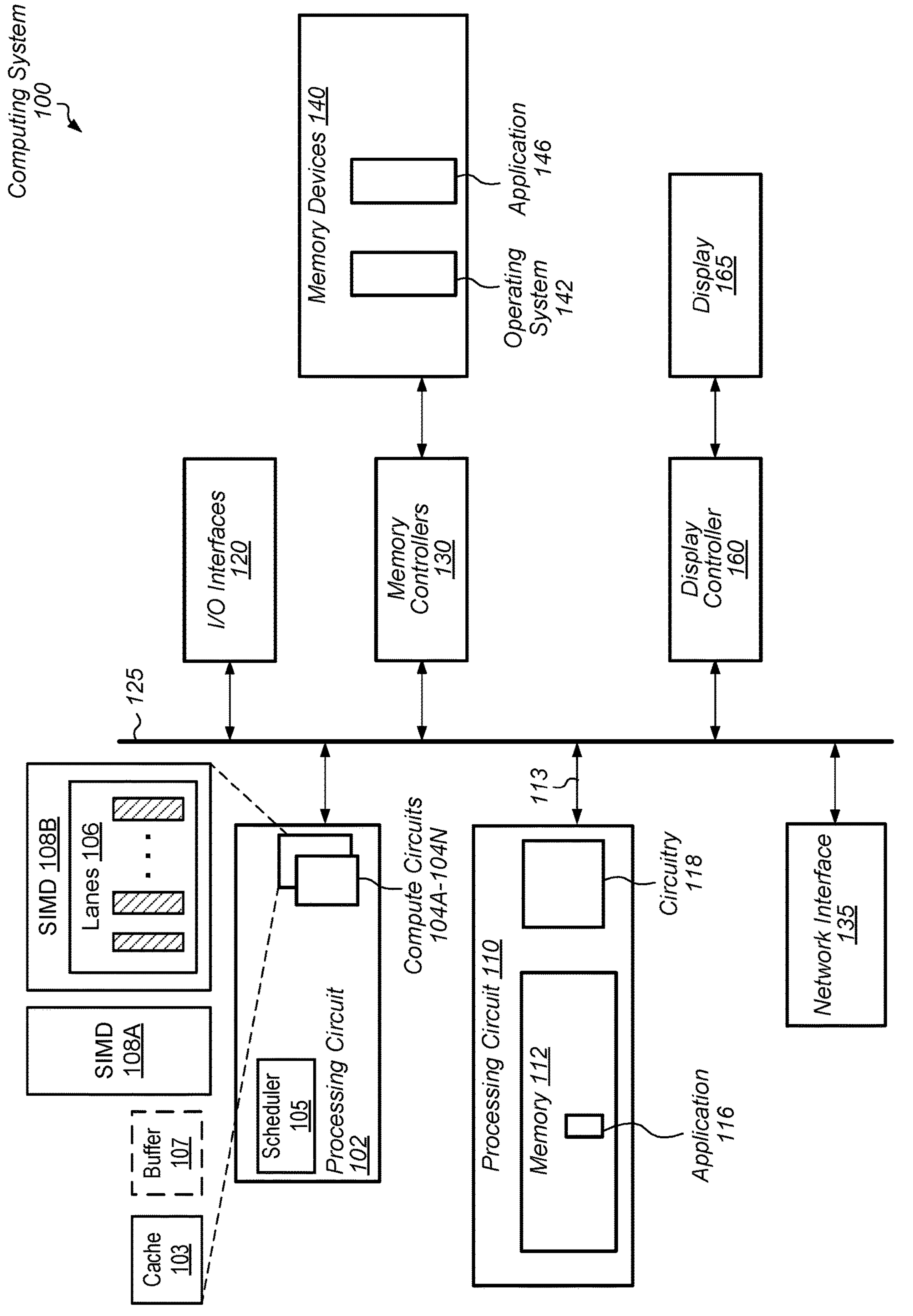
FIG. 1 is a generalized diagram of a computing system that efficiently processing vector memory accesses on an integrated circuit.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods efficiently scheduling wavefronts for execution on an integrated circuit are contemplated. In various implementations, a computing system includes a processing circuit. In various implementations, the processing circuit is a parallel data processing circuit with a highly parallel data microarchitecture. The parallel data processing circuit includes multiple, replicated compute circuits, each with the circuitry of multiple lanes of execution. Each compute circuit executes one or more wavefronts. The parallel data processing circuit includes a memory used to store temporary data. An example of the temporary data is stack data of a function call used by each wavefront that is generated based on the function call. In some implementations, the memory is a local memory of the parallel data processing circuit such as dedicated memory that is not shared with another processing circuit. In an implementation, the local memory is a portion of video memory used to store video frame data. In one implementation, the parallel data processing circuit does not maintain cache coherency information in the local memory. In other implementations, the local memory is a local cache used to store the temporary data.

Each compute circuit includes a dispatch circuit that includes a queue for storing multiple wavefronts before the wavefronts are dispatched to the execution circuits of the compute circuits for execution. Each of the execution circuits is a single instruction multiple data (SIMD) circuit that includes multiple lanes of execution for executing a wavefront. Each compute circuit includes one or more SIMD circuits, and therefore, each compute circuit is able to execute one or more wavefronts. As used herein, the term "dispatch" refers to wavefronts being selected and sent from the dispatch circuit of the compute circuit to the SIMD circuits of the compute circuit. As used herein, the term "issue" refers to instructions of a wavefront in a compute circuit being selected and sent to the multiple lanes of execution of one of the multiple SIMD circuits of the compute circuit. The compute circuit also includes a control circuit that identifies an instruction of the in-flight wavefronts as a long-latency vector memory access instruction with an indication specifying that a destination targets data storage in the cache, rather than a vector register file. In various implementations, the long-latency vector memory access instruction is a long-latency vector load instruction. The control circuit assigns (allocates) cache storage space (e.g., a cache line) for the vector memory access instruction while foregoing vector register assignment. It is noted that the description herein uses the term cache line when referring to the cache storage space. However, the amount of storage assigned need not correspond directly to the size of a cache line. The storage space may be more than or less than a cache line. The control circuit sends a data retrieval request corresponding to the vector memory access instruction to one or more higher levels of a cache memory subsystem.

The SIMD circuits execute other instructions of the in-flight wavefronts using the vector register file until the requested data returns. When the requested data has arrived from the memory subsystem, the control circuit stores the requested data in the assigned cache line of cache. The control circuit sends a notification to one of the SIMD circuits that generated the vector memory access instruction. The notification indicates that the requested data has been returned. When the control circuit receives an indication specifying that the corresponding one of the SIMD circuits is ready to receive the requested data, the control circuit completes the long-latency vector memory access instruction by sending the requested data from the cache to the corresponding one of the SIMD circuits. In some implementations, the compute circuit also includes a buffer for data storage when the cache is full. Further details of these techniques to efficiently schedule wavefronts for execution on an integrated circuit are provided in the following description of FIGS. 1-9.

Turning now to FIG. 1, a generalized diagram is shown of an implementation of a computing system 100 that efficiently processes vector memory accesses on an integrated circuit. In an implementation, computing system 100 includes at least processing circuits 102 and 110, input/output (I/O) interfaces 120, bus 125, network interface 135, memory controllers 130, memory devices 140, display controller 160, and display 165. Processing circuits 102 and 110 are representative of any number of processing circuits which are included in computing system 100. In other implementations, computing system 100 includes other components and/or computing system 100 is arranged differently. For example, power management circuitry, and phased locked loops (PLLs) or other clock generating circuitry are not shown for ease of illustration. In various implementations, the components of the computing system 100 are on the same die such as a system-on-a-chip (SOC). In other implementations, the components are individual dies in a system-in-package (SiP) or a multi-chip module (MCM). A variety of computing devices use the computing system 100 such as a desktop computer, a laptop computer, a server computer, a tablet computer, a smartphone, a gaming device, a smartwatch, and so on.

In an implementation, the processing circuit 110 is a general-purpose central processing unit (CPU). In one implementation, processing circuit 102 is a parallel data processing circuit with a highly parallel data microarchitecture, such as a graphics processing unit (GPU). The processing circuit 102 can be a discrete device, such as a dedicated GPU (dGPU), or the processing circuit 102 can be integrated (an iGPU) in the same package as another processing circuit. Other parallel data processing circuits that can be included in computing system 100 include digital signal processing circuits (DSPs), field programmable gate arrays (FPGAs), application specific integrated circuits (ASICs), and so forth.

In various implementations, processing circuit 102 includes multiple compute circuits 104A-104N, each including similar circuitry and components such as the multiple, parallel computational lanes 106. In some implementations, the processing circuit 102 includes one or more single instruction multiple data (SIMD) circuits 108A-108B, each including the multiple, parallel computational lanes 106. Additionally, each of the compute circuits 104A-104N includes a cache 103 and an optional buffer 107. In some implementations, the parallel computational lanes 106 (or parallel execution lanes 106 or lanes 106) operate in lockstep. In various implementations, the data flow within each of the lanes 106 is pipelined. Pipeline registers are used for storing intermediate results and circuitry for arithmetic logic units (ALUs) perform integer arithmetic, floating-point arithmetic, Boolean logic operations, branch condition comparisons and so forth. These components are not shown for ease of illustration. Each of the ALUs within a given row across lanes 106 includes the same circuitry and functionality, and operates on a same instruction, but different data associated with a different thread. A particular combination of the same instruction and a particular data item of multiple data items is referred to as a "work item." A work item is also referred to as a thread.

The multiple work items (or multiple threads) are grouped into thread groups, where a "thread group" is a partition of work executed in an atomic manner. In some implementations, a thread group includes instructions of a function call that operates on multiple data items concurrently. Each data item is processed independently of other data items, but the same sequence of operations of the subroutine is used. As used herein, a "thread group" is also referred to as a "work block" or a "wavefront." Tasks performed by the parallel data processing circuit 102 can be grouped into a "workgroup" that includes multiple thread groups (or multiple wavefronts).

In an implementation, processing circuit 102 performs video rendering on an 8-pixel by 8-pixel block of a video frame. The corresponding 64 threads are grouped into two wavefronts with each wavefront including 32 threads or 32 work items. The hardware of a SIMD circuit includes 32 parallel lanes of execution. The hardware of a scheduler (not shown) assigns workgroups to the compute circuits 104A-104N. Each of the compute circuits 104A-104N includes a dispatch circuit that includes a queue for storing multiple wavefronts before the wavefronts are dispatched to the SIMD circuits that include the parallel lanes of execution 106. Scheduling circuitry of the assigned compute circuit of the compute circuits 104A-104N divides the received workgroup into two separate wavefronts, stores the two wavefronts in a dispatch circuit, and assigns each wavefront to a respective SIMD circuit. In other implementations, another number of threads and wavefronts are used based on the hardware configuration of the parallel data processing circuit 102.

In some implementations, cache 103 is a local cache used to store data that corresponds to long-latency vector memory access instructions. In other implementations, instead of cache 103, compute circuits 104A-104N include a local memory such as dedicated memory shared by SIMD circuits 108A-108B, but that is not shared with another processing circuit such as processing circuit 110. In yet another implementation, processing circuit 102 includes the local memory that is shared by compute circuits 104A-104N, but that is not shared with another processing circuit such as processing circuit 110. In an implementation, the local memory is a portion of video memory used to store video frame data. In one implementation, processing circuit 102 does not maintain cache coherency information in the local memory. In other implementations, cache 103 is a last level cache structure that maintains cache coherency information and this last level cache structure is shared by SIMD circuits 108A-108B. A compute circuit of the compute circuits 104A-104N dispatches wavefronts from a local dispatch circuit for execution on one of multiple SIMD circuits 108A-108B. The compute circuit identifies an instruction of the in-fight wavefronts as a long-latency vector memory access instruction with an indication specifying that a destination targets data storage in cache 103, rather than a vector register file. The compute circuit assigns a cache line for the vector memory access instruction while foregoing vector register assignment. The compute circuit sends a data retrieval request corresponding to the vector memory access instruction to one or more higher levels of a cache memory subsystem and the memory controller 130.

The SIMD circuits 108A-108B execute other instructions of the in-flight wavefronts using the vector register file until the requested data returns. When the requested data has arrived from the memory subsystem, the circuitry of the compute circuit stores the requested data in the assigned cache line of cache 103 in place of storing the requested data in one of the vector registers of a vector register file. The circuitry of the compute circuit sends a notification to one of the SIMD circuits 108A-108B that generated the vector memory access instruction. In various implementations, the long-latency vector memory access instruction is a long-latency vector load instruction. The notification indicates that the requested data has been returned. When the circuitry receives an indication specifying that the corresponding one of the SIMD circuits 108A-108B is ready to receive the requested data, the circuitry completes the long-latency vector memory access instruction by sending the requested data from the cache 103 to the corresponding one of the SIMD circuits 108A-108B. In some implementations, the circuitry uses buffer 107 for data storage when cache 103 is full. Buffer 107 is separate from the cache memory subsystem and the memory subsystem. Rather, buffer 107 provides local data storage for cases when cache 103 is full.

Although an example of a single instruction multiple data (SIMD) microarchitecture is shown for the compute circuits 104A-104N, other types of highly parallel data microarchitectures are possible and contemplated. The high parallelism offered by the hardware of the compute circuits 104A-104N is used for real-time data processing. Examples of real-time data processing are rendering multiple pixels, image blending, pixel shading, vertex shading, and geometry shading. In such cases, each of the data items of a wavefront is a pixel of an image. The compute circuits 104A-104N can also be used to execute other threads that require operating simultaneously with a relatively high number of different data elements (or data items). Examples of these threads are threads for scientific, medical, finance and encryption/decryption computations.

In one implementation, the processing circuit 110 is a general-purpose processing circuit, such as a CPU, with any number of processing circuit cores that include circuitry for executing program instructions. Memory 112 represents a local hierarchical cache memory subsystem. Memory 112 stores source data, intermediate results data, results data, and copies of data and instructions stored in memory devices 140. For example, memory 112 stores the application 116, which is a copy of the application 144 stored in the memory devices 140. Processing circuit 110 is coupled to bus 125 via interface 113. Processing circuit 110 receives, via interface 113, copies of various data and instructions, such as the operating system 142, one or more device drivers, one or more applications such as application 146, and/or other data and instructions.

The processing circuit 110 retrieves a copy of the application 144 from the memory devices 140, and the processing circuit 110 stores this copy as application 116 in memory 112. One example of application 116 is a highly parallel data application such as a shader program. When the instructions of compiler 114 are executed by circuitry 118, the circuitry 118 compiles the application 116. As part of the compilation, circuitry 118 translates instructions of the application 116 into commands executable by the SIMD circuits 108A-108B of the compute circuits 104A-104N of the processing circuit 102. For example, when the instructions of the compiler 114 are executed by the circuitry 118, the circuitry 118 uses a graphics library with its own application program interface (API) to translate function calls of the application 116 into commands particular to the compute circuits 104A-104N of the processing circuit 102.

To change the scheduling of threads from the processing circuit 110 to the processing circuit 102, software development kits (SDKs) and application programming interfaces (APIs) were developed for use with widely available high-level languages to provide supported function calls. The function calls provide an abstraction layer of the parallel implementation details of processing circuit 102 such as the lanes 106 of the compute circuits 104A-104N. The details are hardware specific to the parallel data processing circuit 102 but hidden to the developer to allow for more flexible writing of software applications. When circuitry 118 executes the instructions of the compiler 114, the circuitry 118 compiles the generated second sequence of instructions into machine executable code for execution by the SIMD circuits of the compute circuits 104A-104N. An example of the processing circuitry is a GPU such as the compute circuits 104A-104N of the processing circuit 102. The function calls in high level languages, such as C, C++, FORTRAN, and Java and so on, are translated to commands which are later processed by the hardware in processing circuit 102.

Platforms such as OpenCL (Open Computing Language), OpenGL (Open Graphics Library), OpenGL for Embedded Systems (OpenGL ES), and Vulkan provide a variety of APIs for running programs on GPUs from AMD, Inc. Developers use OpenCL for simultaneously processing the multiple data elements of the scientific, medical, finance, encryption/decryption and other computations while using OpenGL and OpenGL ES for simultaneously rendering multiple pixels for video graphics computations. Vulkan is a low-overhead, cross-platform API, open standard for three-dimensional (3-D or 3D) graphics applications. Further, DirectX is a platform for running programs on GPUs in systems using one of a variety of Microsoft operating systems.

In an implementation, when executing instructions of a kernel mode driver (KMD), circuitry 118 assigns state information for a command group generated by compiling the application 116. Examples of the state information are a process identifier (ID), a name of the application or an ID of the application, a version of the application, a compute/graphics type of work, and so on. When executing instructions of the kernel mode driver, circuitry 118 sends the command group and state information to a ring buffer 112 in the memory devices 140. The processing circuit 102 accesses, via the memory controllers 130, the command group and state information stored in the ring buffer. For wavefronts based on function calls to be executed, the number of variables to allocate, how to address the variables, and the number of vector registers used to allocate variables are needed. At least the stack data and the heap data determine data allocation.

Static data can be used to allocate statically declared objects, such as global variables and constants. A majority of these objects can be arrays. Stack can also be used to allocate scalar variables rather than arrays, such as local variables and parameters in the functions currently being invoked. Stack data can be grown and shrunk on procedure call or return, respectively. The heap data can be used to allocate dynamic objects accessed with pointers and are typically not scalar variables. The heap data can be used to reduce the frequency of copying the contents of strings and lists by storing the contents of temporary strings or lists during the string/list operations. The heap data is not affected by the return of the function call. The processing circuit 102 schedules the retrieved commands to the compute circuits 104A-104N based on at least the state information. Other examples of scheduling information used to schedule the retrieved commands are age of the commands, priority levels of the commands, an indication of real-time data processing of the commands, and so forth.

In some implementations, computing system 100 utilizes a communication fabric ("fabric"), rather than the bus 125, for transferring requests, responses, and messages between the processing circuits 102 and 110, the I/O interfaces 120, the memory controllers 130, the network interface 135, and the display controller 150. When messages include requests for obtaining targeted data, the circuitry of interfaces within the components of computing system 100 translates target addresses of requested data. In some implementations, the bus 125, or a fabric, includes circuitry for supporting communication, data transmission, network protocols, address formats, interface signals and synchronous/asynchronous clock domain usage for routing data.

Memory controllers 130 are representative of any number and type of memory controllers accessible by processing circuits 102 and 110. While memory controllers 130 are shown as being separate from processing circuits 102 and 110, it should be understood that this merely represents one possible implementation. In other implementations, one of memory controllers 130 is embedded within one or more of processing circuits 102 and 110 or it is located on the same semiconductor die as one or more of processing circuits 102 and 110. Memory controllers 130 are coupled to any number and type of memory devices 140.

Memory devices 140 are representative of any number and type of memory devices. For example, the type of memory in memory devices 140 includes Dynamic Random Access Memory (DRAM), Static Random Access Memory (SRAM), NAND Flash memory, NOR flash memory, Ferroelectric Random Access Memory (FeRAM), or otherwise. Memory devices 140 store at least instructions of an operating system 142, one or more device drivers, and application 144. In some implementations, application 144 is a highly parallel data application such as a video graphics application, a shader application, or other. Copies of these instructions can be stored in a memory or cache device local to processing circuit 110 and/or processing circuit 112.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth. Network interface 135 receives and sends network messages across a network.

Figure 2:
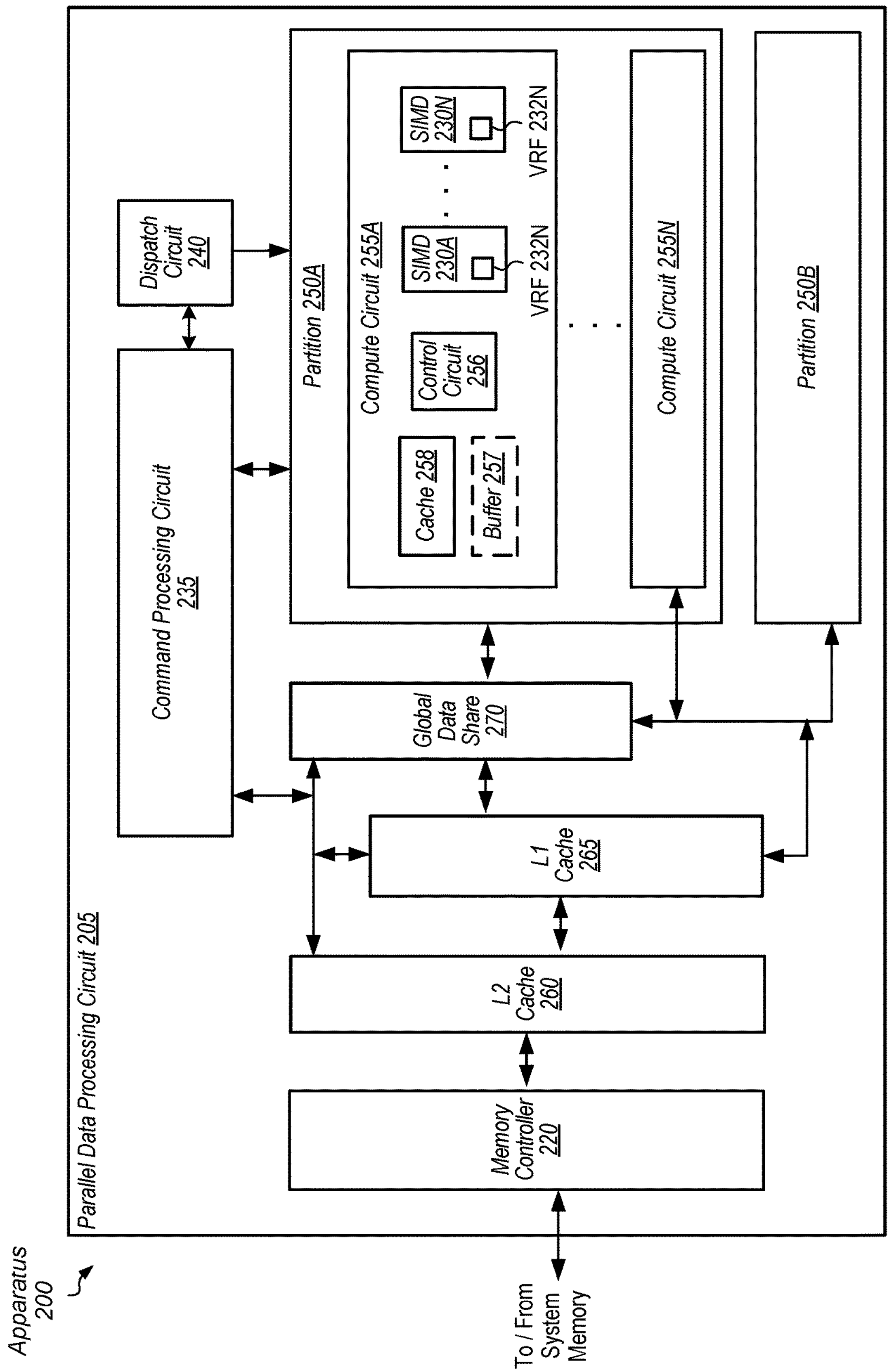
FIG. 2 is a generalized diagram of an apparatus that efficiently processing vector memory accesses on an integrated circuit.

Turning now to FIG. 2, a block diagram of an implementation of an apparatus 200 is shown. In one implementation, apparatus 200 includes the parallel data processing circuit 205 with an interface to system memory. In an implementation, the parallel data processing circuit 205 is a GPU. The apparatus 200 also includes other components which are not shown to avoid obscuring the figure. The parallel data processing circuit 205 includes at least the command processing circuit (or command processor) 235, dispatch circuit 240, compute circuits 255A-255N, memory controller 220, global data share 270, shared level one (L1) cache 265, and level two (L2) cache 260. It should be understood that the components and connections shown for the parallel data processing circuit 205 are merely representative of one type processing circuit and does not preclude the use of other types of processing circuits for implementing the techniques presented herein.

In other implementations, the parallel data processing circuit 205 includes other components, omits one or more of the illustrated components, has multiple instances of a component even if only one instance is shown in the apparatus 200, and/or is organized in other suitable manners. Also, each connection shown in apparatus 200 is representative of any number of connections between components. Additionally, other connections can exist between components even if these connections are not explicitly shown in apparatus 200. In various implementations, the apparatus 200 executes any of various types of highly parallel data applications. As part of executing an application, a host CPU (not shown) launches kernels to be executed by the parallel data processing circuit 205. The command processing circuit 235 receives kernels from the host CPU and uses dispatch circuit 250 to dispatch wavefronts of these kernels to compute circuits 255A-255N.

In various implementations, the circuitry of partition 250B is a replicated instantiation of the circuitry of partition 250A. In some implementations, each of the partitions 250A-250B is a chiplet. In an implementation, the local cache 258 represents a last level shared cache structure such as a local level-two (L2) cache within partition 250A. In other implementations, instead of local cache 258, compute circuits 255A-255N include a local memory such as dedicated memory that is not shared with another processing circuit. In yet another implementation, parallel data processing circuit 205 includes the local memory that is shared by compute circuits 255A-255N, but that is not shared with another processing circuit. In an implementation, the local memory is a portion of video memory used to store video frame data. In one implementation, compute circuits 255A-255N do not maintain cache coherency information in the local memory. Each of the compute circuits 255A-255N receives wavefronts from the dispatch circuit 240 and stores the received wavefronts in a corresponding local dispatch circuit (not shown). Control circuit 256 schedules these wavefronts to be dispatched from the local dispatch circuits to SIMD circuits 230A-230N of the compute circuits 255A-255N. Control circuit 256 includes circuitry for dynamically assigning and allocating vector registers of vector general-purpose register files, or vector register files (VRFs 232A-232N), to wavefronts at call boundaries.

Threads within wavefronts executing on compute circuits 255A-255N read and write data to corresponding cache 258, vector registers 232A-232N, global data share 270, shared L1 cache 265, and L2 cache 260. It is noted that L1 cache 265 can include separate structures for data and instruction caches. It is also noted that global data share 270, shared L1 cache 265, L2 cache 260, memory controller 220, system memory, and caches 230A-230N can collectively be referred to herein as a "memory subsystem". In some implementations, the wavefronts executing on the SIMD circuits 230A-230N generate long-latency vector memory access instructions targeting temporary data. An example of the temporary data is stack data of a function call used by each wavefront that is generated based on the function call. Static data can be used to allocate statically declared objects, such as global variables and constants. A majority of these objects can be arrays. The stack data can also be used to allocate scalar variables rather than arrays, such as local variables and parameters in the functions currently being invoked. Stack data can be grown and shrunk on procedure call or return, respectively.

In an implementation, a long-latency vector memory access instruction can have a latency of 400-500 clock cycles between issuing of the vector memory access instruction and arrival of the requested data from the memory subsystem at the requesting one of the compute circuits 255A-255N. Afterward, the wavefront uses the retrieved data for only 10-20 clock cycles. Rather than assign and allocate a vector register of the VRFs 232A-232N that stores data to be used for only 10-20 clock cycles of the 500 or more idle clock cycles of the vector register, the control circuit 256 assigns and allocates a cache line of cache 258 based on an indication stored in the vector memory access instruction specifying the destination. In various implementations, the long-latency vector memory access instruction is a long-latency vector load instruction. In an implementation, control circuit 256 selects the cache line based on a value of a base register stored in a programmable configuration register and an offset provided by the vector memory access instruction. In some implementations, control circuit 256 detects a type of long-latency vector memory access instruction based on one or more fields of the vector memory access instruction such as at least an opcode field.

Control circuit 256 sends a data retrieval request corresponding to the vector memory access instruction to one or more of the global data share 270, shared L1 cache 265, the L2 cache 260, and the memory controller 220. Compute circuit 255A executes other instructions of the in-flight wavefronts using the VRFs 232A-232N until the requested data returns. When the requested data has arrived from the memory subsystem, control circuit 256 directs storage of the requested data to the assigned cache line of cache 258 in place of storing the requested data in one of the vector registers of VRFs 232A-232N. Control circuit 256 sends a notification to one of the SIMD circuits 230A-230N that generated the vector memory access instruction. The notification indicates that the requested data has been returned. When control circuit 256 receives an indication specifying that the corresponding one of the SIMD circuits 230A-230N is ready to receive the requested data, control circuit 256 completes the long-latency vector memory access instruction by sending the requested data from the cache 258 to the corresponding one of the SIMD circuits 230A-230N.

In some implementations, control circuit 256 uses buffer 257 for data storage when cache 258 is full. Buffer 257 is separate from the cache memory subsystem and the memory subsystem. Rather, buffer 257 provides local data storage for cases when cache 258 is full. In other implementations, when cache 258 is full and has no available cache lines, control circuit 256 sends the requested data to one or more of the global data share 270, shared L1 cache 265, and the L2 cache 260. Control circuit 256 retrieves the requested data for data storage in cache 258 when data storage space becomes available again in cache 258.

Figure 3:
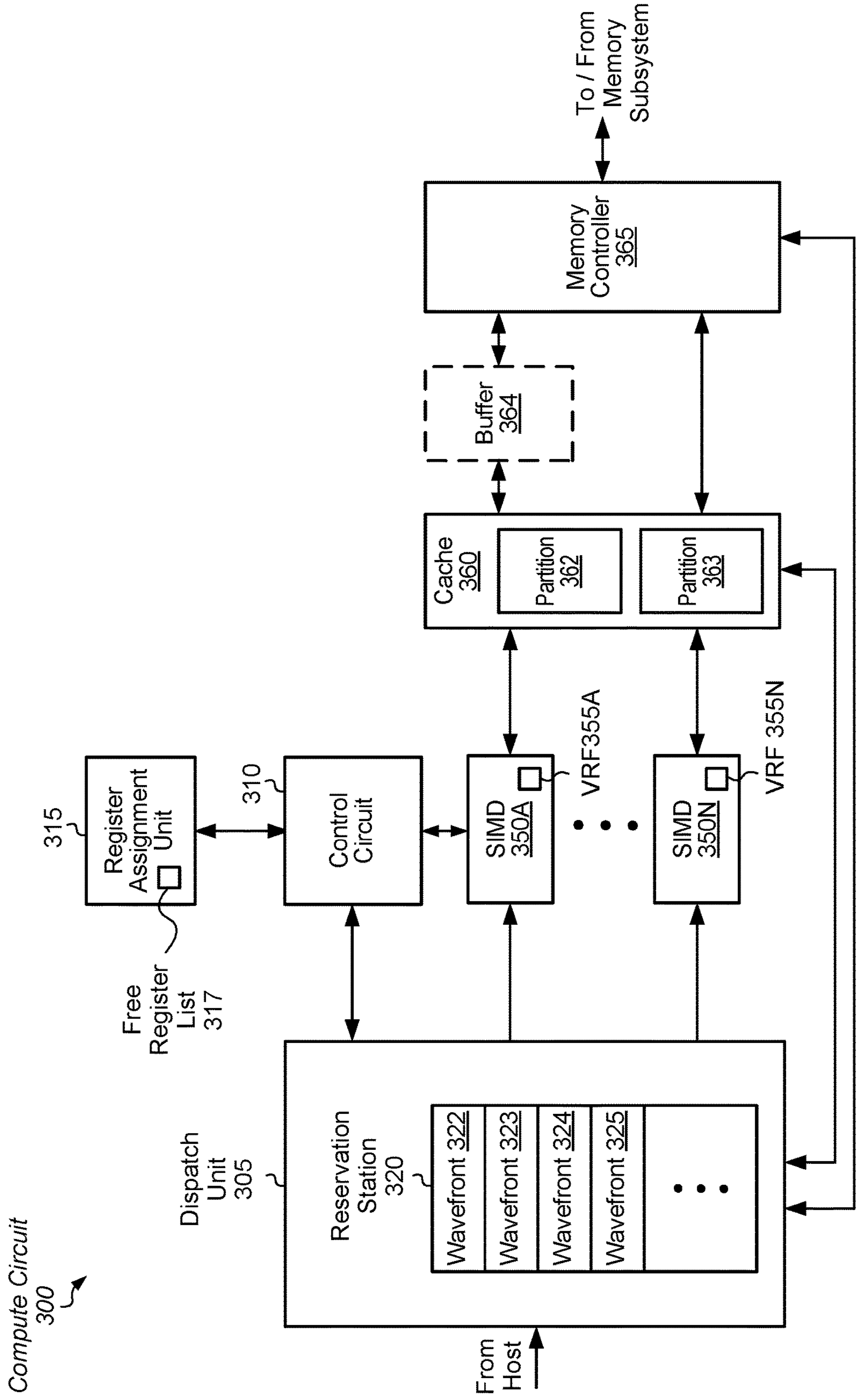
FIG. 3 is a generalized diagram of compute circuit that efficiently processing vector memory accesses on an integrated circuit.

Referring now to FIG. 3, a block diagram of one implementation of a compute circuit 300 is shown. In one implementation, the components of compute circuit 300 are included within compute circuits 255A-255N of the parallel data processing circuit 205 (of FIG. 2). It should be understood that compute circuit 300 can also include other components, which are not shown to avoid obscuring the figure. Also, it is noted that the arrangement of components shown for compute circuit 300 are merely indicative of one particular implementation. In other implementations, compute circuit 300 can have other arrangements of components.

In one implementation, dispatch circuit 305 is a local dispatch circuit that receives wavefronts from an external dispatch circuit or external scheduler controlled by a command processing circuit (e.g., command processing circuit 235 of FIG. 2). The dispatch circuit 305 launches wavefronts on single instruction multiple data (SIMD) circuits 350A-350N based on control signals from the control circuit 310. SIMD circuits 350A-N are representative of any number of SIMD circuits, with the number varying according to the implementation. In one implementation, dispatch circuit 305 maintains a reservation station 320 to keep track of both pending wavefronts and in-flight wavefronts. As shown, reservation station 320 includes entries for wavefronts 322, 323, 324, and 325, which are representative of any number of both pending wavefronts and outstanding wavefronts. The number of outstanding wavefronts can vary during execution of an application.

The reservation station 320 can also be referred to as ordered list 320 where the wavefronts are ordered according to their relative priority level. A corresponding priority level of a wavefront is based on one or more of an age of the wavefront, a quality of service (QOS) parameter of the wavefront, a corresponding reservation data size of the wavefront, a ratio of the corresponding reservation data size to the available data storage space in the cache, an application identifier or type, such as a real-time application, and so forth. In one implementation, when dispatch circuit 305 is getting ready to launch a next wavefront, dispatch circuit 305 queries control circuit 310 to determine an initial number of vector registers to allocate to the next wavefront. In this implementation, control circuit 310 queries register assignment circuit 315 when determining how to dynamically allocate vector registers of vector register files (VRFs) 355A-355N at the granularity of the functions of wavefronts.

In one implementation, register assignment circuit 315 includes free register list 317 which includes identifiers (IDs) of the vector registers of VRFs 355A-355N that are currently available for allocation. If there are enough vector registers available in free register list 317 for the next function of a wavefront, then control circuit 310 assigns these vector registers to the next wavefront. Otherwise, if there are insufficient vector registers available in free register list 317 for the next wavefront, it is possible for the control circuit 310 to stall the launch of the next wavefront. One or more of the register assignment circuit 315, the control circuit 310, and the reservation station 320 maintains a count of vector registers of VRFs 355A-355N allocated to the wavefronts 322-325. Cache 360 is a local cache used to store data such as temporary data. An example of the temporary data is stack data of a function call used by each wavefront that is generated based on the function call. The control circuit 310 also monitors the available data storage space in the cache 360.

In various implementations, the control circuit 310 has the functionality of control circuit 256 (of FIG. 2), and cache 360 has the functionality of cache 103 (of FIG. 1) and cache 258 (of FIG. 2) and the optional buffer 364 has the same functionality of buffer 107 (of FIG. 1) and buffer 257 (of FIG. 2). When the requested data has arrived from the memory subsystem, one or more of the memory controller 365 and control circuit 310 directs storage of the requested data to the assigned cache line of cache 310 in place of storing the requested data in one of the vector registers of VRFs 355A-355N. Control circuit 310 sends a notification to one of the SIMD circuits 350A-350N that executed the vector memory access instruction. The notification indicates that the requested data has been returned. In some implementations, cache 360 is divided into partitions such as partition 362 and partition 363. In an implementation, control circuit 310 or the corresponding cache controller of cache 360 stores data being retrieved for a collective operation in partition 363 and stores data being retrieved for non-collective operations in partition 362. Examples of these collective operations are a Gather operation, a Gather Random operation, a Scatter operation, a Scatter Random operation, a Reduce operation, a Scan operation, a Broadcast operation, and so forth. Examples of two-sided collective operations are the AllGather operation, the AllGatherRandom operation, the AllScatter operation, the AllScatterRandom operation, and the AllReduce operation. Control circuit 310 manages data movement from partition 362 to go to a corresponding one of the SIMD circuits 350A-350N. Control circuit 310 manages data movement from partition 363 to go to partition 362. Data movement from partition 363 to partition 362 occurs when all the data requested by a collective operation is stored in the cache 360.

It is noted that the arrangement of components such as dispatch circuit 305, control circuit 310, and register assignment circuit 315 shown in FIG. 3 is merely representative of one implementation. In another implementation, dispatch circuit 305, control circuit 310, and register assignment circuit 315 are combined into a single circuit. In other implementations, the functionality of dispatch circuit 305, control circuit 310, and register assignment circuit 315 can be partitioned into other circuits in varying manners.

It is possible and contemplated that one or more of the processing circuits, the compute circuits, and apparatuses illustrated in FIGS. 1-3 are implemented as chiplets. As used herein, a "chiplet" is also referred to as an "intellectual property block" (or IP block). However, a "chiplet" is a semiconductor die (or die) fabricated separately from other dies, and then interconnected with these other dies in a single integrated circuit in the MCM. On a single silicon wafer, chiplets are fabricated as multiple instantiated copies of particular integrated circuitry, rather than fabricated with other functional blocks that do not use an instantiated copy of the particular integrated circuitry. For example, the chiplets are not fabricated on a silicon wafer with various other functional blocks and processors on a larger semiconductor die such as an SoC. A first silicon wafer (or first wafer) is fabricated with multiple instantiated copies of integrated circuitry a first chiplet, and this first wafer is diced using laser cutting techniques to separate the multiple copies of the first chiplet.

A second silicon wafer (or second wafer) is fabricated with multiple instantiated copies of integrated circuitry of a second chiplet, and this second wafer is diced using laser cutting techniques to separate the multiple copies of the second chiplet. The first chiplet provides functionality different from the functionality of the second chiplet. One or more copies of the first chiplet are placed in an integrated circuit, and one or more copies of the second chiplet is placed in the integrated circuit. The first chiplet and the second chiplet are interconnected to one another within a corresponding MCM. Such a process replaces a process that fabricates a third silicon wafer (or third wafer) with multiple copies of a single, monolithic semiconductor die that includes the functionality of the first chiplet and the second chiplet as integrated functional blocks within the single, monolithic semiconductor die.

Process yield of single, monolithic dies on a silicon wafer is lower than process yield of smaller chiplets on a separate silicon wafer. In addition, a semiconductor process can be adapted for the particular type of chiplet being fabricated. With single, monolithic dies, each die on the wafer is formed with the same fabrication process. However, it is possible that an interface functional block does not require process parameters of a semiconductor manufacturer's expensive process that provides the fastest devices and smallest geometric dimensions. With separate chiplets, designers can add or remove chiplets for particular integrated circuits to readily create products for a variety of performance categories. In contrast, an entirely new silicon wafer must be fabricated for a different product when single, monolithic dies are used. It is possible and contemplated that one or more of the processing circuits, the compute circuits, and apparatuses illustrated in FIGS. 1-3 are implemented as chiplets.

Figure 6:
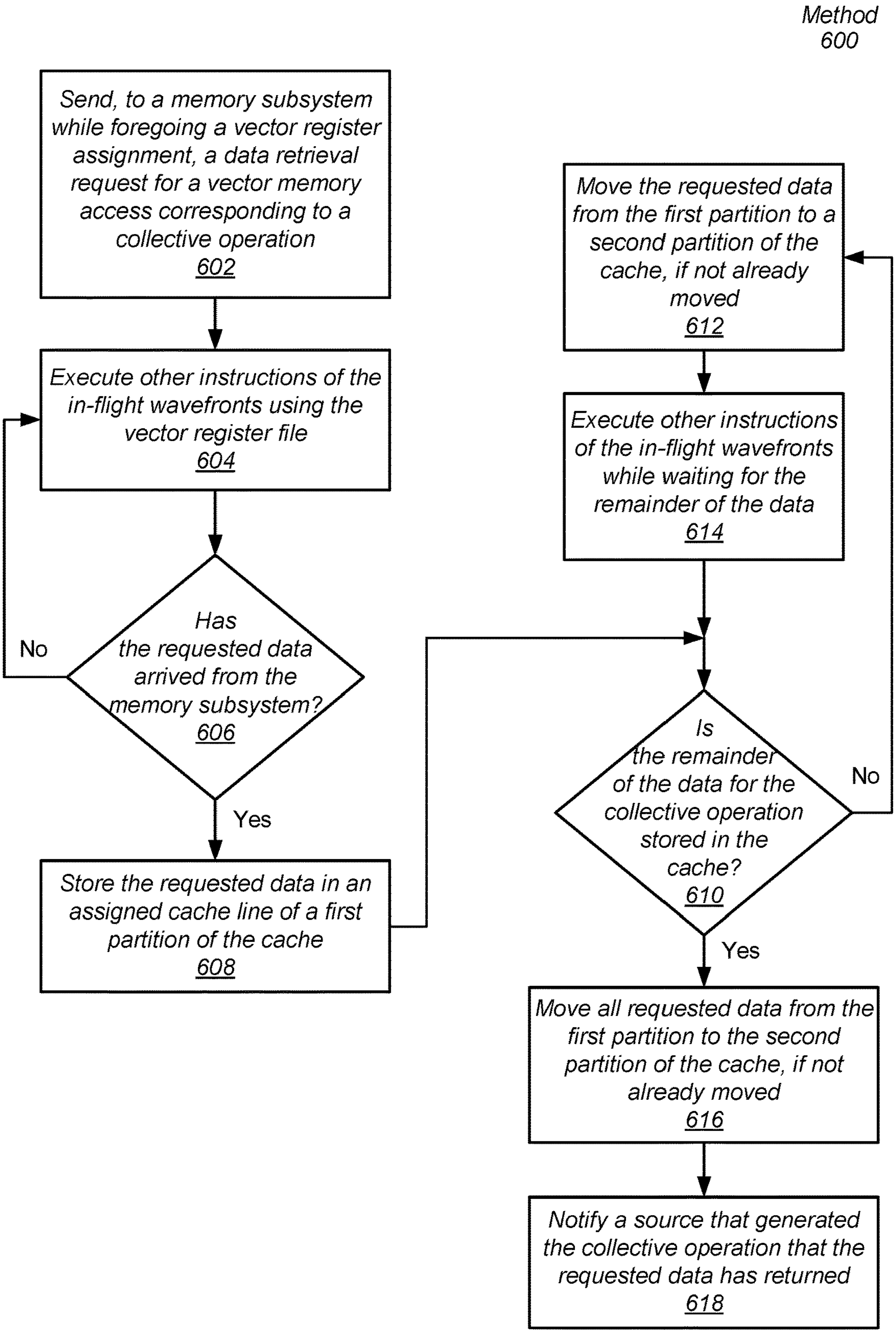
FIG. 6 is a generalized diagram of a method for efficiently processing vector memory accesses on an integrated circuit.

In some implementations, the hardware of the processing circuits and the apparatuses illustrated in FIGS. 1 and 6 is provided in a two-dimensional (2D) integrated circuit (IC) with the dies placed in a 2D package. In other implementations, the hardware is provided in a three-dimensional (3D) stacked integrated circuit (IC). A 3D integrated circuit includes a package substrate with multiple semiconductor dies (or dies) integrated vertically on top of it. Utilizing three-dimensional integrated circuits (3D ICs) further reduces latencies of input/output signals between functional blocks on separate semiconductor dies. It is noted that although the terms "left," "right," "horizontal," "vertical," "row," "column," "top," and "bottom" are used to describe the hardware, the meaning of the terms can change as the integrated circuits are rotated or flipped.

Figure 4:
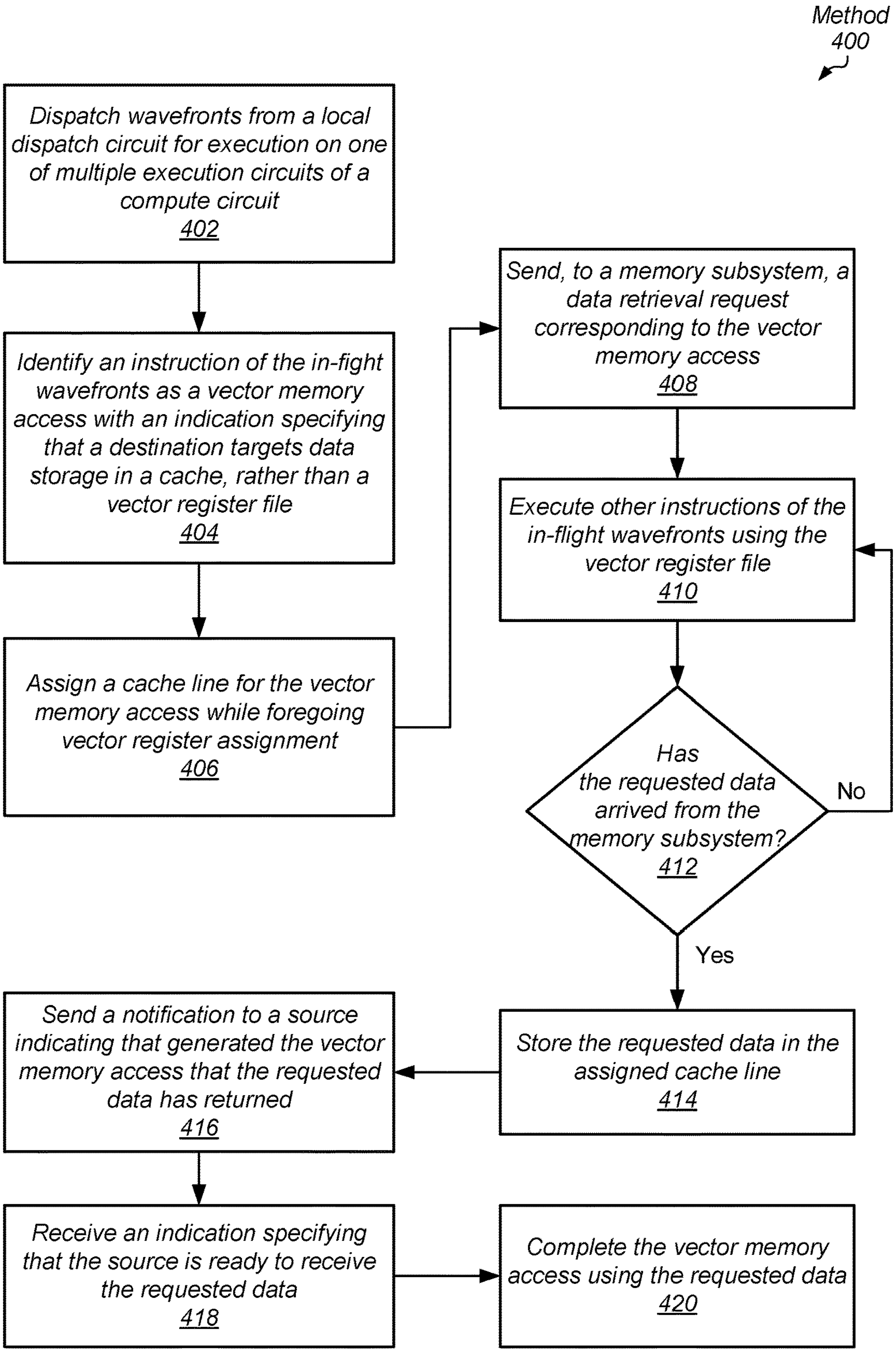
FIG. 4 is a generalized diagram of a method for efficiently processing vector memory accesses on an integrated circuit.

Regarding the methods 400-600 (of FIGS. 4-6), a computing system includes multiple cache levels, multiple execution circuits for executing wavefronts, and circuitry used to efficiently process vector memory accesses. In various implementations, a parallel data processing circuit utilizes a highly parallel data microarchitecture. The parallel data processing circuit includes multiple, replicated compute circuits, each with one or more execution circuits. Each execution circuit includes multiple lanes of execution for executing a wavefront. Therefore, each compute circuit executes one or more wavefronts. Referring to FIG. 4, a generalized block diagram is shown of method 400 for efficiently processing vector memory accesses on an integrated circuit. For purposes of discussion, the steps in this implementation (as well as FIGS. 5-6) are shown in sequential order. However, in other implementations some steps occur in a different order than shown, some steps are performed concurrently, some steps are combined with other steps, and some steps are absent.

A control circuit dispatches wavefronts from a local dispatch circuit for execution on one of multiple execution circuits of a compute circuit (block 402). The control circuit identifies an instruction of the in-fight wavefronts as a vector memory access with an indication specifying that a destination targets data storage in a cache, rather than a vector register file (block 404). The control circuit assigns a cache line for the vector memory access while foregoing vector register assignment (block 406). The control circuit sends, to a memory subsystem, a data retrieval request corresponding to the vector memory access instruction (block 408).

SIMD circuits of compute circuits execute other instructions of the in-flight wavefronts using the vector register file (block 410). If the requested data has not yet arrived from the memory subsystem ("no" branch of the conditional block 412), then control flow of method 400 returns to block 410 where the SIMD circuits execute other instructions of the in-flight wavefronts using the vector register file. Otherwise, if the requested data has arrived from the memory subsystem ("yes" branch of the conditional block 412), then the control circuit stores the requested data in the assigned cache line (block 414). The control circuit sends a notification to a source, such as one of the SIMD circuits that generated the vector memory access instruction, that the requested data has returned (block 416). At a later point in time, the control circuit receives an indication specifying that the source is ready to receive the requested data (block 418). The control circuit completes the vector memory access instruction by sending the requested data to the SIMD circuit for use during execution of a wavefront (block 420).

Figure 5:
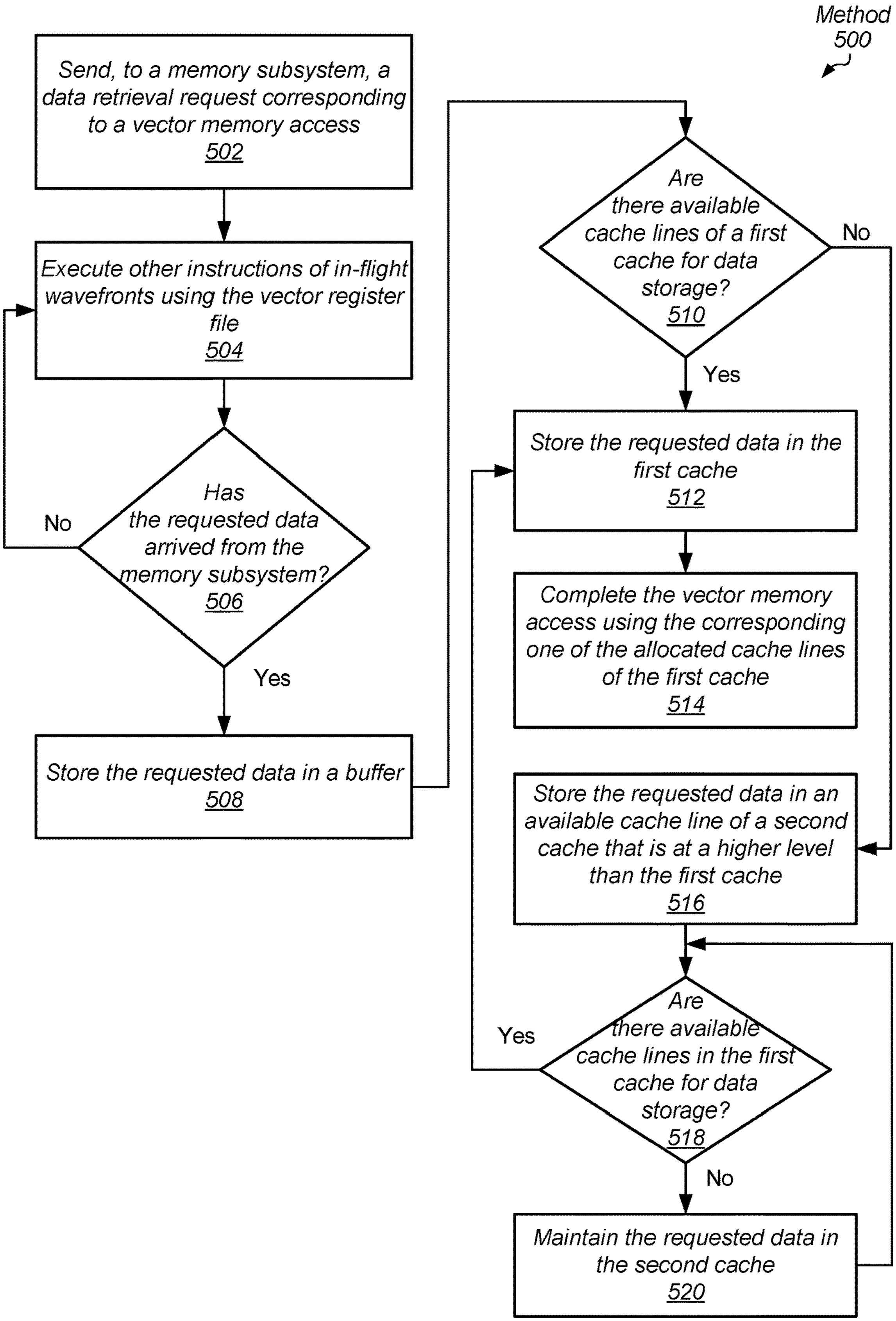
FIG. 5 is a generalized diagram of a method for efficiently processing vector memory accesses on an integrated circuit.

Turning now to FIG. 5, a generalized block diagram is shown of method 500 for efficiently processing vector memory accesses on an integrated circuit. A control circuit of a parallel data processing circuit sends, to a memory subsystem, a data retrieval request corresponding to a vector memory access instruction (block 502). SIMD circuits of compute circuits execute other instructions of in-flight wavefronts using a vector register file (block 504). If the requested data has not yet arrived from the memory subsystem ("no" branch of the conditional block 506), then control flow of method 500 returns to block 504 where the SIMD circuits execute other instructions of the in-flight wavefronts using the vector register file. Otherwise, if the requested data has arrived from the memory subsystem (yes" branch of the conditional block 506), then the control circuit stores the requested data in a buffer (block 508).

If there are available cache lines of a first cache for data storage ("yes" branch of the conditional block 510), then the control circuit stores the requested data in the first cache (block 512). The control circuit completes the vector memory access instruction using the corresponding one of the allocated cache lines of the first cache (block 514). If there are no available cache lines of the first cache for data storage ("no" branch of the conditional block 510), then the control circuit stores the requested data in an available cache line of a second cache that is at a higher level than the first cache (block 516). At a later point in time, if there are available cache lines of the first cache for data storage ("yes" branch of the conditional block 518), then control flow of method 500 moves to block 512 where the control circuit stores the requested data in the first cache (block 520). If there are no available cache lines of the first cache for data storage ("no" branch of the conditional block 518), then the control circuit maintains the requested data in the second cache (block 522). Afterward, control flow of method 500 returns to conditional block 518.

Turning now to FIG. 6, a generalized block diagram is shown of method 600 for efficiently processing vector memory accesses on an integrated circuit. A control circuit of a parallel data processing circuit sends to a memory subsystem while foregoing a vector register assignment, a data retrieval request for a vector memory access corresponding to a collective operation (block 602). The SIMD circuits of compute circuits execute other instructions of the in-flight wavefronts using the vector register file (block 604). If the requested data has not yet arrived from the memory subsystem ("no" branch of the conditional block 606), then control flow of method 600 returns to block 604 where the SIMD circuits execute other instructions of the in-flight wavefronts using the vector register file. Otherwise, if the requested data has arrived from the memory subsystem ("yes" branch of the conditional block 606), then the control circuit stores the requested data in an assigned cache line of a first partition of the cache (block 608).

If the remainder of the data for the collective operation is not stored in the cache ("no" branch of the conditional block 610), then the control circuit moves the requested data from the first partition to a second partition of the cache, if not already moved (block 612). The SIMD circuits execute other instructions of the in-flight wavefronts while waiting for the remainder of the data (block 614). Afterward, control flow of method 600 returns to conditional block 610. If the remainder of the data for the collective operation is stored in the cache (yes" branch of the conditional block 610), then the control circuit moves all requested data from the first partition to the second partition of the cache, if not already moved (block 616). The control circuit notifies a source that generated the collective operation that the requested data has returned (block 618).

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high-level programming language such as C, or a design language (HDL) such as Verilog, VHDL, or database format such as GDS II stream format (GDSII). In some cases, the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware-based type emulator from such vendors as Cadence®, EVER, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:

circuitry configured to:

assign first memory storage space of a first memory for a first vector memory access instruction, responsive to the first vector memory access instruction;

store requested data of the first vector memory access instruction in the first memory storage space, responsive to the requested data returning from a memory subsystem; and send a notification to an execution circuit processing a wavefront indicating that the requested data is ready for access.

2. The apparatus as recited in claim 1, wherein the circuitry is further configured to store the requested data of the first vector memory access instruction in the first memory storage space in place of a vector register of a vector register file.

3. The apparatus as recited in claim 1, wherein the circuitry is further configured to send the requested data to the execution circuit, responsive to receiving an indication from the execution circuit specifying that the execution circuit is ready for the requested data.

4. The apparatus as recited in claim 1, wherein the circuitry is further configured to maintain the requested data in the first memory storage space until receiving an indication from the execution circuit specifying that the execution circuit is ready for the requested data.

5. The apparatus as recited in claim 1, wherein the circuitry is further configured to assign the first memory storage space based on an offset value indicated by the first vector memory access instruction.

6. The apparatus as recited in claim 5, wherein the circuitry is further configured to assign the first memory storage space based on a base address stored in a configuration register.

7. The apparatus as recited in claim 1, wherein the circuitry is further configured to store the requested data in a first partition of a plurality of partitions of the first memory, responsive to the first vector memory access instruction corresponds to a collective operation.

8. The apparatus as recited in claim 7, wherein the circuitry is further configured to move requested data from the first partition to a second partition of the plurality of partitions, responsive to remainder of data for the collective operation is stored in the first memory.

9. The apparatus as recited in claim 8, wherein the circuitry is further configured to manage data movement:

to the execution circuit from the second partition; and to the second partition from the first partition.

10. The apparatus as recited in claim 1, wherein the circuitry is further configured to assign second memory storage space of a second memory at a different level of the memory subsystem than the first memory, responsive to an indication specifying that the first memory is full.

11. The apparatus as recited in claim 1, wherein the circuitry is further configured to assign buffer storage space of a buffer different from any memory of the memory subsystem, responsive to an indication specifying that the first memory is full.

12. A method comprising:

assigning, by circuitry, first memory storage space of a first memory for a first vector memory access instruction, responsive to the first vector memory access instruction;

storing requested data of the first vector memory access instruction in the first memory storage space, responsive to the requested data returning from a memory subsystem; and sending a notification to an execution circuit processing a wavefront indicating that the requested data is ready for access.

13. The method as recited in claim 12, further comprising storing, by the circuitry, the requested data of the first vector memory access instruction in the first memory storage space in place of a vector register of a vector register file.

14. The method as recited in claim 12, further comprising sending, by the circuitry, the requested data to the execution circuit, responsive to receiving an indication from the execution circuit specifying that the execution circuit is ready for the requested data.

15. The method as recited in claim 12, further comprising maintaining, by the circuitry, the requested data in the first memory storage space until receiving an indication from the execution circuit specifying that the execution circuit is ready for the requested data.

16. The method as recited in claim 12, further comprising assigning, by the circuitry, the first memory storage space based on an offset value indicated by the first vector memory access instruction.

17. The method as recited in claim 16, further comprising assigning, by the circuitry, the first memory storage space based on a base address stored in a configuration register.

18. The method as recited in claim 12, further comprising storing, by the circuitry, the requested data in a first partition of a plurality of partitions of the first memory, responsive to the first vector memory access instruction corresponds to a collective operation.

19. The method as recited in claim 18, further comprising moving, by the circuitry, requested data from the first partition to a second partition of the plurality of partitions, responsive to remainder of data for the collective operation is stored in the first memory.

20. The method as recited in claim 19, further comprising managing, by the circuitry, data movement:

to the execution circuit from the second partition; and to the second partition from the first partition.

21. The method as recited in claim 12, further comprising assigning, by the circuitry, for a second vector memory access instruction, second memory storage space of a second memory at a different level of the memory subsystem than the first memory, responsive to an indication that the first memory is full.

22. The method as recited in claim 12, further comprising assigning, by the circuitry, buffer storage space of a buffer different from any memory of the memory subsystem, responsive to an indication specifying that the first memory is full.

23. A computing system comprising:

a plurality of execution circuits, each comprising circuitry configured to process one or more wavefronts of a plurality of wavefronts; and circuitry configured to:

assign first memory storage space of a first memory for a first vector memory access instruction, responsive to the first vector memory access instruction;

store requested data of the first vector memory access instruction in the first memory storage space, responsive to detecting the requested data has returned from a memory subsystem; and send a notification to an execution circuit of the plurality of execution circuits processing a wavefront indicating that the requested data is ready for access.

24. The computing system as recited in claim 23, wherein the circuitry is further configured to store the requested data of the first vector memory access instruction in the first memory storage space in place of a vector register of a vector register file.

25. The computing system as recited in claim 23, wherein the circuitry is further configured to send the requested data to the execution circuit of the plurality of execution circuits, responsive to an indication that the execution circuit is ready for the requested data.

26. The computing system as recited in claim 23, wherein the circuitry is further configured to maintain the requested data in the first memory storage space until receiving an indication from the execution circuit that the execution circuit is ready for the requested data.

27. The computing system as recited in claim 23, wherein the circuitry is further configured to assign the first memory storage space based on an offset value indicated by the first vector memory access instruction.

28. The computing system as recited in claim 27, wherein the circuitry is further configured to assign the first memory storage space based on a base address stored in a configuration register.

29. The computing system as recited in claim 23, wherein the circuitry is further configured to store the requested data in a first partition of a plurality of partitions of the first memory, responsive to the first vector memory access instruction corresponds to a collective operation.

30. The computing system as recited in claim 29, wherein the circuitry is further configured to move requested data from the first partition to a second partition of the plurality of partitions, responsive to remainder of data for the collective operation is stored in the first memory.

31. The computing system as recited in claim 30, wherein the circuitry is further configured to manage data movement:

to the execution circuit from the second partition; and to the second partition from the first partition.

32. The computing system as recited in claim 23, wherein the circuitry is further configured to assign, for a second vector memory access instruction, second memory storage space of a second memory at a different level of the memory subsystem than the first memory, responsive to an indication that the first memory is full.

33. The computing system as recited in claim 23, wherein the circuitry is further configured to assign buffer storage space of a buffer different from any memory of the memory subsystem, responsive to an indication specifying that the first memory is full.

* * * * *